United States Patent [19]
Koshiyouji et al.

[11] Patent Number: 5,150,227
[45] Date of Patent: Sep. 22, 1992

[54] APPARATUS FOR READING CHARACTER OR GRAPHICS IMAGE ON DOCUMENT

[75] Inventors: Takashi Koshiyouji, Yokohama; Teruhiko Uno, Mitaka; Shuuji Kizu, Yokohama, all of Japan

[73] Assignee: Kabushiki Kaisha Toshiba, Kawasaki, Japan

[21] Appl. No.: 541,329

[22] Filed: Jun. 21, 1990

[30] Foreign Application Priority Data

Jun. 23, 1989 [JP] Japan .................................. 1-162225

[51] Int. Cl.⁵ .............................................. H04N 1/04
[52] U.S. Cl. ..................................... 358/497; 358/474; 358/412; 355/235
[58] Field of Search ............... 358/412, 420, 410, 497, 358/474; 235/436; 355/235

[56] References Cited
U.S. PATENT DOCUMENTS 4,159,488 6/1979 Tanaka et al. ....................... 358/212
4,571,061 2/1986 Osanai et al. ........................... 355/8
4,943,870 7/1990 Sugishima ............................ 358/451

Primary Examiner—Leo H. Boudreau
Assistant Examiner—Steven P. Klocinski
Attorney, Agent, or Firm—Finnegan, Henderson, Farabow, Garrett and Dunner

[57] ABSTRACT

An apparatus is capable of reading a character or graphics image on a document at a plurality of reading linear densities. An illuminating device for illuminating the document, a focusing device for focusing the light beam reflected by the document, and a CCD reading sensor for converting the focused light beam into an electric image signal, are integrally assembled together to constitute a carriage device. This carriage device is shifted in a desirable shifting which is determined on the basis of the reading sensitivity of the CCD reading sensor and which corresponds to the linear reading density. The rotation speed of a driving device used for driving the carriage device is reduced to a desirable value by means of a transmission, the conversion ratio of which is determined on the basis of the least common multiple (LCM) of a plurality of reading linear densities. The driving pulses which should be supplied to the driving device can be easily calculated by use of the product of the "reference pulse" $\phi p$ and the "multiplier unit" Un, which are also determined on the basis of the above least common multiple.

16 Claims, 5 Drawing Sheets

APPARATUS FOR READING CHARACTER OR GRAPHICS IMAGE ON DOCUMENT

BACKGROUND OF THE INVENTION

1. Field of the Invention

The present invention relates to an image-reading apparatus for reading a character or graphics image on a document, and more particularly to an image-reading apparatus which supplies image data to an image processor connected to a computer or the like, or which is incorporated in a facsimile machine.

2. Description of the Related Art

In general, an image-reading apparatus for reading a character or graphics image comprises: a document table on which a document is mounted; and a carriage device movable in parallel to the document table and elongated in the first direction, i.e., the main scanning direction, in which the image portion within a given elongate region on the document is read. The carriage device contains the following structural components: an illumination device for illuminating a document; a focusing device for focusing the light beam reflected by the document on a predetermined position, i.e., the reflected light beam representing the image portion within the elongate region; and a conversion device, i.e., a CCD line sensor, for converting the reflected light beam focused by the focusing device into an electric image signal. These structural components are integrally assembled as one unit. The image-reading apparatus is provided with a driving device for shifting either the document table or the carriage device in a second direction, i.e., an auxiliary scanning direction perpendicular to the main scanning direction, so as to successively read the image portions on the document through the elongate region.

The image-reading apparatus reads an image as follows. First of all, a document is placed on the document table, with the image-shown side facing the carriage device. Then, the document is illuminated with the light-rays emitted from the illumination device of the carriage device. The light beam reflected by the document, i.e., information representing the character or graphics image shown on the document, is focused by the focusing device of the carriage device such that the reflected light beam is focused on the light-receiving surface of the CCD line sensor. Thus, the reflected light beam is converted into an electric image signal. In this manner, the image portion within the given elongate region is read in the main scanning direction. Next, the carriage device is shifted in parallel to the document table; alternatively, the document table is shifted in parallel to the carriage device. In this condition, the image portion within the elongate region is read in a similar manner to that mentioned above. With the above operations repeated, all character or graphics image portions shown on the document are sequentially read from the document and are converted into electric image signals. The electric image signals produced by the CCD line sensor are supplied to a memory or a image processing device as image information signals, so as to enable the image to be reproduced or processed.

Incidentally, it is desirable for an image-reading apparatus of the above-mentioned type to have a function of varying the reading density in accordance with purposes.

U.S. Pat. No. 4,571,061 discloses an image forming apparatus, which provided continuously variable copy ratio and which can thus copy an original image at any copy ratio desired.

A user operates the input console of this image forming apparatus, thereby inputting the copy ratio at which the original image is to be, for example, reduced and copied on a copy-paper sheet smaller than the original sheet. The copy ratio is changed to any desired value in accordance with the position of the lens located between the original and the photosensitive drum of the apparatus, more precisely, the ratio of the distance A between the original and the lens to the distance B between the lens and the drum. The copy ratio is given as:

$$1/A + 1/B = 1/f$$

where f is the focal length of the lens.

The lens is shifted in accordance with the desired copy ratio input by operating the input console. Further, two drive devices drive the photosensitive drum and the original-scanning carriage device, incorporated in the apparatus, respectively, at the velocities determined by the copy ratio thus input.

In the image-reading apparatus using the CCD line sensor, the light beam accumulation time, which is the minimum time required for reliably reading the information supplied to the sensor, is maintained at a constant value. Thus, the reading width per line by which the CCD line sensor can read an image during each reading operation has to be equal to the distance for which the CCD line sensor is shifted in the auxiliary scanning direction during the light beam accumulation time. Since the number of pulses which are supplied to the pulse step motor is an integer, the pulse step motor shifts the CCD line sensor in the auxiliary scanning direction for a distance by the integer times. Therefore, in order to equalize the reading width per line with the distance for which the CCD line sensor is shifted in the auxiliary scanning direction, a transmission mechanism is interposed between the pulse step motor and the CCD line sensor. In the case where a plurality of linear reading densities are used, however, the distance for which the CCD line sensor is shifted in accordance with each of the linear densities may not correspond to the number of pulses which ar supplied to the pulse step motor through the transmission mechanism.

SUMMARY OF THE INVENTION

Accordingly, an object of the present invention is to provide image-reading apparatus capable of varying the reading density in a number of ways. Another object of the present invention is to provide an image-reading apparatus wherein the light beam accumulation time, determining the reading sensitivity of a CCD line sensor, can be maintained at a constant value even if the shifting period of a carriage device, i.e., the shifting period of the CCD line sensor, is varied. Still another object of the present invention is to provide an image-reading apparatus wherein the light beam accumulation time of a CCD line sensor, i.e., the driving period of the CCD line sensor, can be accurately synchronized with the shifting distance in which the CCD line sensor is shifted in the auxiliary scanning direction.

To achieve these objects, the present invention provides an apparatus for reading an image, comprising: means for selecting one of first and second modes, the first and second mode defining first and second numbers of line images for reading the image, respectively; means for sensing the line image; and means for moving the sensing means, the moving means including a pulse motor capable of changing a rotation thereof in accordance with the mode selected by said selecting means and converting means for converting the rotation of the pulse motor to a linear movement of the sensing means at a predetermined conversion ratio which is determined based on the least common multiple of the first and second numbers of line images in the first and second modes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

One embodiment of the present invention will now be described, with reference to the accompanying drawings.

Figure 1:
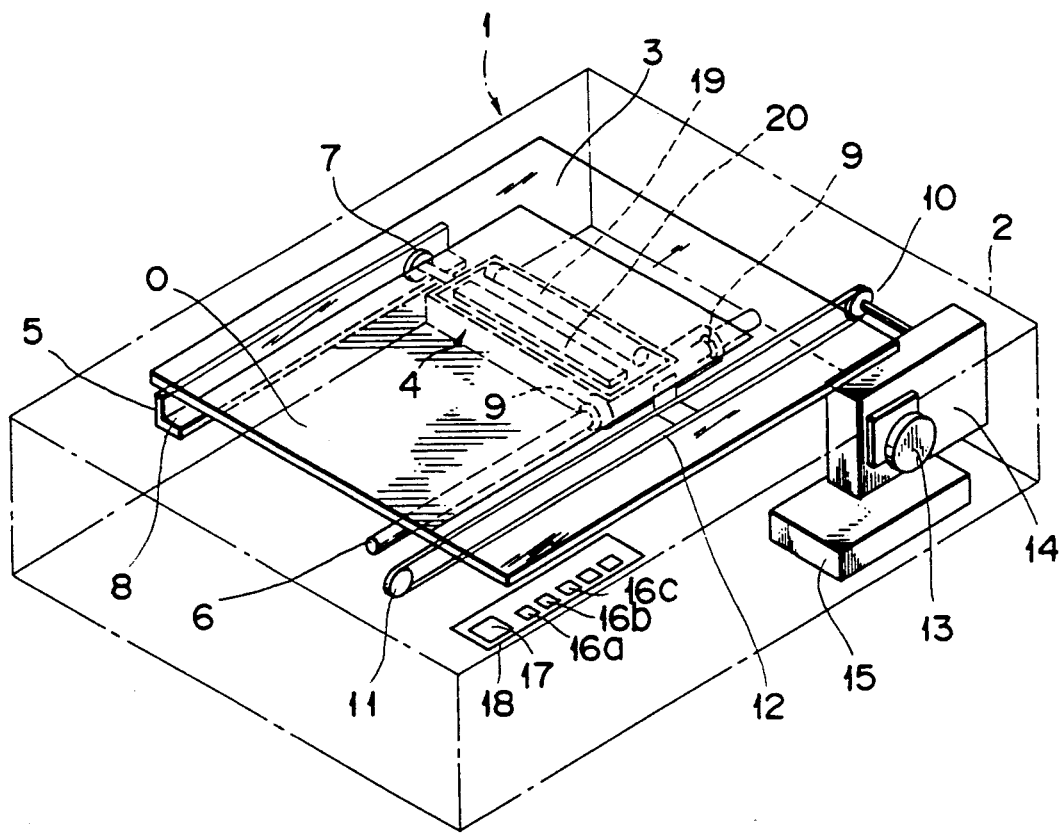
FIG. 1 is a schematic illustration of an image-reading apparatus according to one embodiment of the present invention.

Referring to FIG. 1, the image-reading apparatus 1 comprises a box-like casing 2 which contains devices and units to be mentioned later. (Only the outside lines of the casing 2 are shown in FIG. 1.) A document table 3 on which a document O having a character or graphics image is mounted on top of the casing 2. A pair of carriage-supporting members 5 and 6, which movably supports a carriage device 4, are located under the document table 3. The carriage-supporting members 5 and 6 are respectively attached to the two opposite side walls of the casing 2, e.g., to the front and rear side walls of the casing 2, such that they extend in parallel to each other. One of the carriage-supporting members 5 and 6, e.g., the rear one 5, is formed like a plate or L-shaped plate and has a guide surface 8. This guide surface 8 supports a guide roller 7 located at one end of the carriage device 4 such that the guide roller 7 can roll along the guide surface 8. The other one of the carriage-supporting members 5 and 6, e.g., the front one 6, is formed like a rod and extends through a slide hole 9 formed at the other end of the carriage device 4. The casing 2 contains a driving mechanism located on the side of carriage-supporting member 6. To be specific, the driving mechanism is a pulse step motor 13 which is mechanically connected to a tooth belt 12, a steel belt having teeth formed of rubber resin, etc., wound around both a driving tooth belt pulley 10 and driven toothed pulley 11 and which rotates the driving pulley 10. The casing 2 also contains a speed-changing mechanism or transmission 14 for changing the output speed of the motor 13 from Na to Nc, and a control device 15 for controlling the output speed of the motor 13. An operation panel 18 is provided on the casing 2. The operation panel 18 has selection keys 16a–16c used for selecting a desirable linear reading density Dn, and a plurality of input keys, e.g., an input key 17 for starting a reading operation.

The carriage device 4 is prevented from vibrating lengthwise, i.e., in the main scanning direction, by the front one 6 of the carriage-supporting members, and is permitted to shift in the auxiliary scanning direction by the guide roller 7 rolling along the guide surface 8 of the carriage-supporting member 5. As is apparent from FIG. 2, the carriage device 4 has an illumination device 19 for illuminating the document 0 placed on the document table 3; a focusing device 20 for focusing the light beam reflected from the document; a conversion device 21 for converting into electric image signals the light beam guided by the focusing device 20; and a main frame 22 for integrally holding the devices 19–21.

The focusing device 20 is a lens array made up of mono-focus rod lenses 23 each having a short focal length. These rod lenses 23 are arranged in one or more rows and are integrally molded together. Such a lens array is commercially available from Nippon Sheet Glass Co., Ltd. in the trade name of a Selfoc Lens Array (SLA). The conversion device 21 is a CCD line sensor having a number of reading elements 24. Each reading element 24 has a elongate or substantially square shape, and the length of one side of each element is about 10 $\mu$m. The reading elements 24 are arranged in one line or more.

Figure 2:
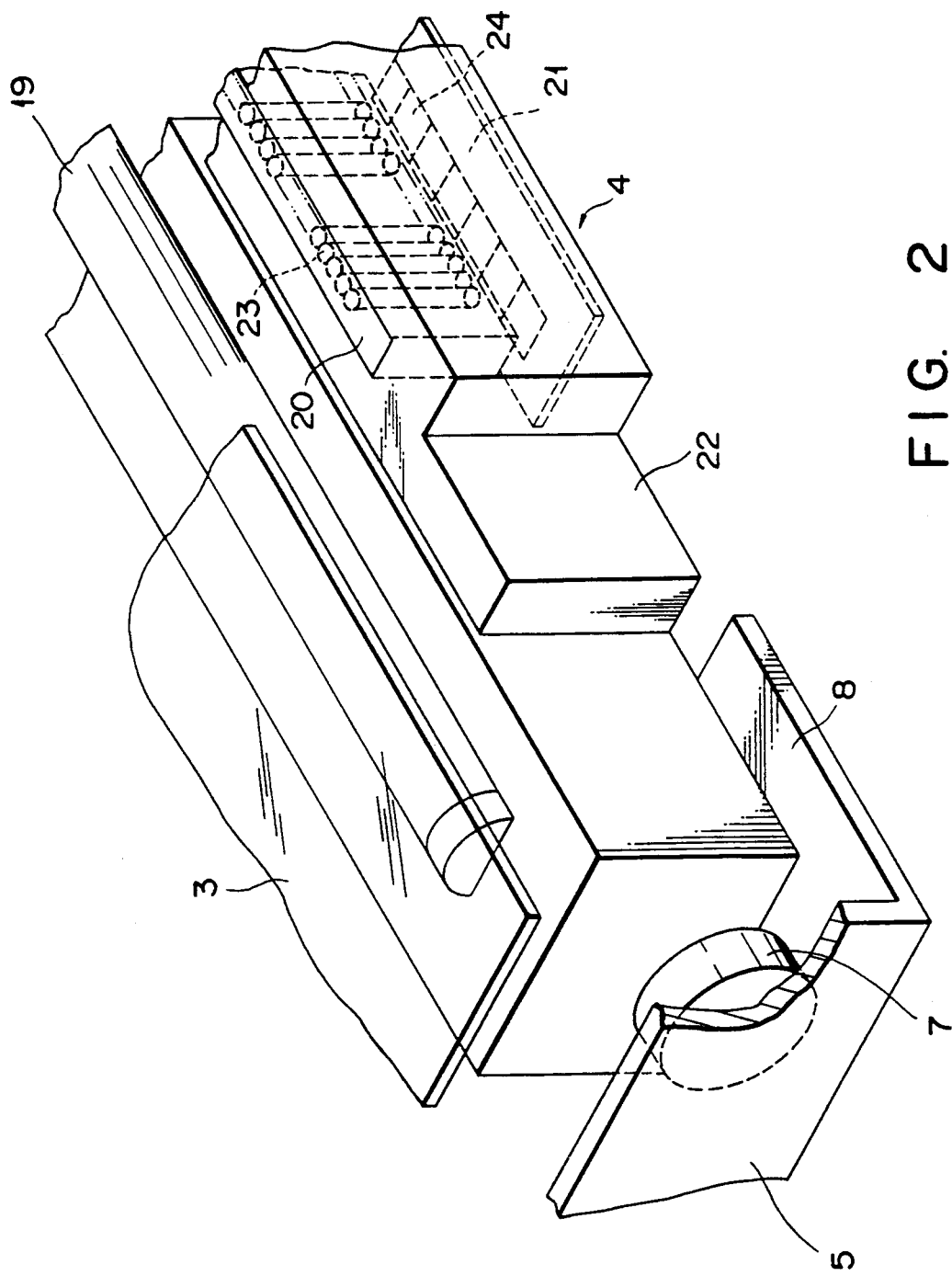
FIG. 2 is a schematic illustration of the carriage device incorporated in the image-reading apparatus, only the focusing device and photoelectric conversion device of the carriage device being shown in the illustration, for simplicity.

A description will now be given as to how the reading density is related to both the shifting velocity and shifting distance of the carriage device, so as to permit the image-reading apparatus shown in FIGS. 1 and 2 to read an image at a desirable linear reading density.

In general, in the case where the linear reading density is D (lines/mm), a document is read such that its portion whose width is 1 mm in the auxiliary scanning direction is scanned D times. Thus, the reading width W per line which corresponds to the linear reading density D is given by 1/D mm. Since the light beam accumulation time SH, which is the minimum time required for reliably reading the information supplied to the sensor, should be maintained at a constant value, the velocity V at which the CCD line sensor shifts over the reading width W is determined on the basis of the light beam accumulation time SH and the reading width W. A pulse step motor is used for shifting the CCD line sensor, and the output speed Na of this pulse step motor has to be determined in such a manner as to provide the shifting velocity V. To provide this shifting velocity V, a transmission is interposed between the CCD line sensor and the pulse step motor. The transmission is made up of: a shifting mechanism which shifts CCD line sensor in a desirable direction and has an arbitrarily-determined movement coefficient k, and a speed-changing mechanism which obtains a desirable output speed Nc from the output speed Na provided by the motor and has an arbitrarily-determined conversion ratio G. For example, the shifting mechanism is constituted by pulleys and belts which are adapted to convert the rotation of the motor to a linear movement, and the speed-changing mechanism is obtained by a combination of a number of pulleys and belts. Due to the use of this transmission, the shifting velocity V and the output speed Na of the motor are determined on the basis of the movement coefficient k of the shifting mechanism and of the conversion ratio G of the speed-changing mechanism. The movement coefficient k is dependent on the diameter of a driving pulley used for converting the rotation of the motor into linear motion, and the conversion ratio G is dependent on the manner in which the pulleys, belts, and/or gears are combined.

The shifting velocity V and the output speed Na of the motor will be described in more detail.

The shifting velocity V is given by the following formula:

$$V = W/SH = (1/D)/SH \quad (1)$$
$$= Na \times \kappa \times G/SH$$

Since the motor is a pulse step motor, the output speed Na of the motor is given by the following formula:

$$Na = (\Phi \times \theta)/360° \quad (2)$$

where $\Phi$ represents the number of pulses supplied to the motor, and $\theta$ denotes a step angle peculiar to the motor.

From formulas (1) and (2), the shifting velocity can be expressed as follows:

$$V = (\Phi \times \theta \times k \times G)/(360° \times SH) \ldots \quad (3)$$

From formulas (1) and (3), the distance L for which the CCD line sensor shifts during the light beam accumulation time SH can be expressed as follows:

$$L = V/SH = (\Phi \times \theta \times k \times G)/360° \ldots \quad (4)$$

In the image-reading apparatus using the CCD line sensor, the number $\Phi$ of pulses which are supplied to the pulse step motor to shift the CCD line sensor in the auxiliary direction is an integer, as mentioned above with reference to the related art of the invention. Thus, the movement coefficient k and the conversion ratio G are determined such that the number $\Phi$ of pulses supplied to the motor, which determines the output speed Na provided by the motor, becomes an integer. As is seen from formulas (1)-(4), the output speed Na of the motor is determined by the number $\Phi$ of pulses. In the case where the CCD line sensor is shifted, the rotation of the motor is converted into linear motion by use of the shifting mechanism having the movement coefficient k. Needless to say, therefore, a variation in the number $\Phi$ of pulses supplied to the motor results in a variation in the corresponding shifting distance and/or the corresponding shifting velocity. Let us assume that the sensor can read images at different linear reading densities DX, DY, DZ (X, Y, Z: are numerals representing the corresponding density):

$DX = X$ (lines/mm) or resolution of $1/X$ mm $DY = Y$ (lines/mm) or resolution of $1/Y$ mm $DZ = Z$ (lines/mm) or resolution of $1/Z$ mm If the density D is X, the CCD line sensor reads X data items while shifting over the original for a distance of 1 mm in the sub-scanning direction. Similarly, if the density D is Y, the sensor reads Y data items while shifting over the original for a distance of 1 mm in the sub-scanning direction; if the density D is Z, the CCD line sensor reads Z data items while shifting over the original for a distance of 1 mm in the sub-scanning direction.

Therefore, in the case where the linear reading densities are DX, DY and DZ, the CCD line sensor is shifted in units of 1/X, 1/Y and 1/Z mm, respectively. Therefore, it may be understood that the reading width determined for the light beam accumulation time SH is not large if the linear reading density is low, and is large if the linear reading density is high. It may be also understood that the CCD line sensor is shifted fast during the light beam accumulation time if the linear reading density D is low, and is shifted slowly if the linear reading density D is high. Since the CCD line sensor should be shifted over the regions defined by the reading widths WX, WY and WZ during the light beam accumulation time SH, it is shifted at the velocity VX, VY and VZ, which correspond to the reading widths WX, WY and WZ, respectively.

On the basis of the formula (1), the shifting velocities VX, VY and VZ of the CCD line sensor can be expressed as follows:

$$\begin{aligned} VX &= (1/X)/SH \\ &= (\Phi X \times \theta \times \kappa \times G)/(360° \times SH) \\ VY &= (1/Y)/SH \\ &= (\Phi Y \times \theta \times \kappa \times G)/(360° \times SH) \\ VZ &= (1/Z)/SH \\ &= (\Phi Z \times \theta \times \kappa \times G)/(360° \times SH) \end{aligned} \quad (5)$$

From these shifting velocities VX, VY and VZ, the numbers $\Phi X$, $\Phi Y$ and $\Phi Z$ of pulses which should be supplied to the motor during the light beam accumulation time SH for the linear reading densities X, Y and Z can be calculated as follows:

$$\Phi X = 360°/(\theta \times k \times G \times X)$$

$$\Phi Y = 360°/(\theta \times k \times G \times Y)$$

$$\Phi Z = 360°/(\theta \times k \times G \times Z) \quad (6)$$

However, since a single movement coefficient k is available for the shifting mechanism interposed between the motor and the CCD line sensor and since a single conversion ratio G is available for the speed-changing mechanism also interposed between the motor and the CCD line sensor, it may happen that the numbers $\Phi X$, $\Phi Y$, and $\Phi Z$ of pulses will adversely affect one another. In some cases, these numbers $\Phi X$, $\Phi Y$ and $\Phi Z$ will not be integers.

A description will now be given as to how the numbers $\Phi X$, $\Phi Y$ and $\Phi Z$ of pulses supplied to the motor are made to become integers with respect to a plurality of linear reading densities DX, DY and DZ.

Let it be assumed that the "$360°/(\theta \times k \times G)$" in formula (6) is expressed as follows:

$$360°/(\theta \times k \times G) = \alpha \ldots \quad (7)$$

In this case, the pulse numbers $\Phi X$, $\Phi Y$ and $\Phi Z$ can be written as follows:

$$\Phi X = \alpha/X, \ \Phi Y = \alpha/Y, \text{ and } \Phi Z = \alpha/Z \ldots \quad (8)$$

From formulas (8), $\alpha$ can be represented as follows:

$$\alpha = \Phi X/X = \Phi Y/Y = \Phi Z/Z \ldots \quad (9)$$

Hence, $$\Phi X = (\Phi Y \times X)/Y = (\Phi Z \times X)/Z$$

$$\Phi Y = (\Phi X \times Y)/X = (\Phi Z \times Y)/Z$$

$$\Phi Z = (\Phi X \times Z)/X = (\Phi Y \times Z)/Y \ldots \quad (10)$$

These formulas show that the pulse numbers $\Phi X$, $\Phi Y$ and $\Phi Z$ corresponding to the linear densities X, Y and Z have certain relationships with one another. In other words, the formulas representing the pulse numbers $\Phi X$, $\Phi Y$ and $\Phi Z$ include a factor common to them.

Let us consider under which condition the above pulse numbers $\Phi X$, $\Phi Y$ and $\Phi Z$ are related to one another and how the formulas representing the pulse numbers will be if they are divided by a reference pulse $\phi P$ obtained on the basis of the condition. More specifically, a reference pulse which is common to the pulse numbers $\Phi X$, $\Phi Y$ and $\Phi Z$ will be sought and the pulse numbers $\Phi X$, $\Phi Y$ and $\Phi Z$ will be defined such that they will be an integral multiple of the reference pulse $\phi P$.

The reference pulse $\phi P$ common to the pulse numbers $\Phi X$, $\Phi Y$ and $\Phi Z$ can be easily determined by obtaining the least common multiple (LCM) of the values representing the reading densities.

The least common multiple (LCM) of the pulse numbers $\Phi X$, $\Phi Y$ and $\Phi Z$ or that of the linear reading densities X, Y and Z is given by:

$$LCM = Xa \times Yb \times Zc \times pna \times pnb \times pnn \ldots \quad (11)$$

where pna, pnb, ... pnn are prime numbers, and Xa, Yb and Zc are prime factors obtained by factorizing X, Y and Z, respectively. Hence, $$\Phi X = \{(X \times Y \times Z)/X\} \times \phi P$$

$$\Phi Y = \{(X \times Y \times Z)/Y\} \times \phi P$$

$$\Phi Z = \{(X \times Y \times Z)/Z\} \times \phi P \ldots \quad (12)$$

where X, Y and Z are assumed to be prime numbers, for the simplicity of description.

If it is assumed that $(X \times Y \times Z)/X$, $(X \times Y \times Z)/Y$, and $(X \times Y \times Z)/Z$ represent multiplier unit UX, UY and UZ, then the formulas (12) can be rewritten as follows:

$$\Phi X = UX \times \phi P$$

$$\Phi Y = UY \times \phi P$$

$$\Phi Z = UZ \times \phi P \ldots \quad (13)$$

As can be understood from the above, the number $\Phi$ of pulses supplied to the motor in correspondence to each of the linear densities DX, DY and DZ can be made to be an integer by dividing the light beam accumulation time SH with the LCM derived from the numbers X, Y and Z which represent the reading densities, and by defining the pulse number $\Phi$, which determines the output speed Na of the motor, such that it is an integral multiple of the reference pulse $\phi P$ obtained on the basis of the LCM. Needless to say, the movement coefficient k and the conversion ratio G mentioned above have to be determined in such a manner that the number $\Phi$ of pulses supplied to the motor becomes an integer.

Next, a description will be given as to how the image-reading apparatus is controlled, with reference to FIGS. 3 and 4.

First, the operator turns on one of the density-selection keys 16a, 16b and 16c of the operation panel 18, so as to select a desirable linear density Dn (n: a number representing the corresponding density) from among a plurality of available linear reading densities DX, DY and DZ. In response to this, the CPU 27 selects the shifting velocity Vn corresponding to the selected linear density Dn from among a plurality of available shifting velocities VX, VY and VZ. These shifting velocities are predetermined in correspondence to the respective linear reading densities DX, DY and DZ, and either the carriage device or the CCD line sensor 21 is shifted on the basis of them. Simultaneous with the selection of the shifting velocity Vn, the CPU 27 selects the multiplier unit Un corresponding to the shifting velocity Vn from among a plurality of multiplier units UX, Y and UZ. These multiplier units are predetermined in correspondence to the respective linear reading densities DX, DY and DZ. The CPU 27 supplies the selected multiplier unit Un to both the CCD driver 28 and the motor driver 29. The CPU 27 has a memory section (not shown). In this memory section, the data regarding the following is stored: the shifting velocities VX, VY and VZ; the multiplier units UX, UY and UZ; a reference pulse $\phi P$ (which is derived from the linear reading densities DX, DY and DZ and the light beam accumulation time SH and is used as a reference when either the CCD line sensor 21 or the motor 13 is driven in accordance with the linear reading densities DX, DY and DZ); a pulse ratio PR determined between the reference pulse $\phi P$ and the clock pulse $\phi CL$, etc. The CPU 27 also supplies the pulse ratio PR to the CCD driver 28 and the motor driver 29 when it supplies the multiplier unit.

The CCD driver 28 produces CCD line sensor-driving pulses by utilization of the clock pulse $\phi CL$ generated by the clock generator 26 and of the multiplier unit Un and the pulse ratio PR both supplied thereto from the CPU 27. The CCD line sensor-driving pulses include a shifting pulse $\phi SF$ with which to shift the charge stored in the CCD line sensor 21, a resetting pulse $\phi RS$ with which to transfer the charge stored in the CCD line sensor 21, etc. On the basis of these CCD line sensor driving pulses, the CCD line sensor 21 performs photoelectric conversion of information. The light beam accumulation time SH, which is peculiar to the CCD line sensor 21, is maintained at the predetermined value on the basis of the combination of the clock pulse $\phi CL$, the multiplier unit Un, and the pulse ratio PR. The number of shifting pulses $\phi SF$ and that of resetting pulses $\phi RS$ are constantly counted, using the multiplier unit Un as one unit, so as to achieve synchronization with reference to the rotation of a motor to be mentioned later.

Electrically biased by the CCD driver 28, the CCD line sensor 21 converts the information shown on a document into electric image signals.

The motor driver 29 generates a reference pulse $\phi P$ by utilization of the clock pulse $\phi CL$ generated by the clock generator 26 and of the multiplier unit Un and the pulse ratio PR both supplied thereto from the CPU 27. The motor 13 is rotated on the basis of the reference pulse $\phi P$. The number of reference pulses $\phi P$ generated during the light beam accumulation time SH, namely, the pulse number $\Phi n$, is determined by the multiplier unit Un. On the basis of the reference pulses $\phi P$, the pulse step motor 13 is rotated such that the shifting distance L corresponding to the multiplier unit Un is obtained. More specifically, it is rotated such that the output speed Nn of the motor during the light beam accumulation time SH corresponds to the linear reading density Dn. Accordingly, either the carriage device 4 or the CCD line sensor 21 is shifted at the desirable shifting velocit Vn.

The transmission 14 is set to have a conversion ratio G. This conversion ratio G is predetermined such that the number Un of reference pulses $\phi P$ supplied to the motor 13 is constantly an integer.

Figure 3:
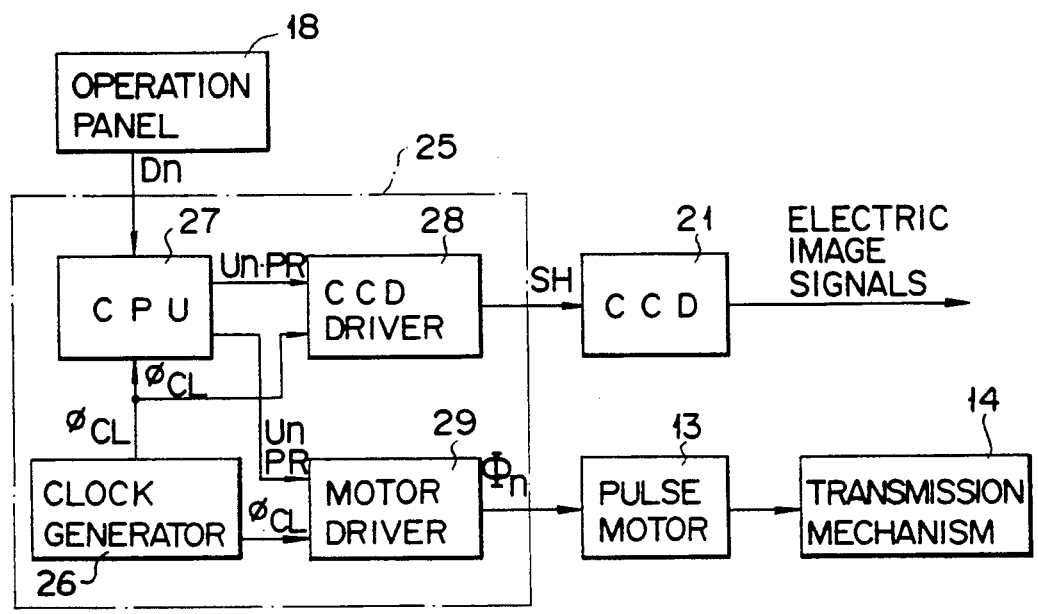
FIG. 3 is a block diagram showing a control circuit which may be used for controlling the image-reading apparatus illustrated in FIGS. 1 and 3.
Figure 4:
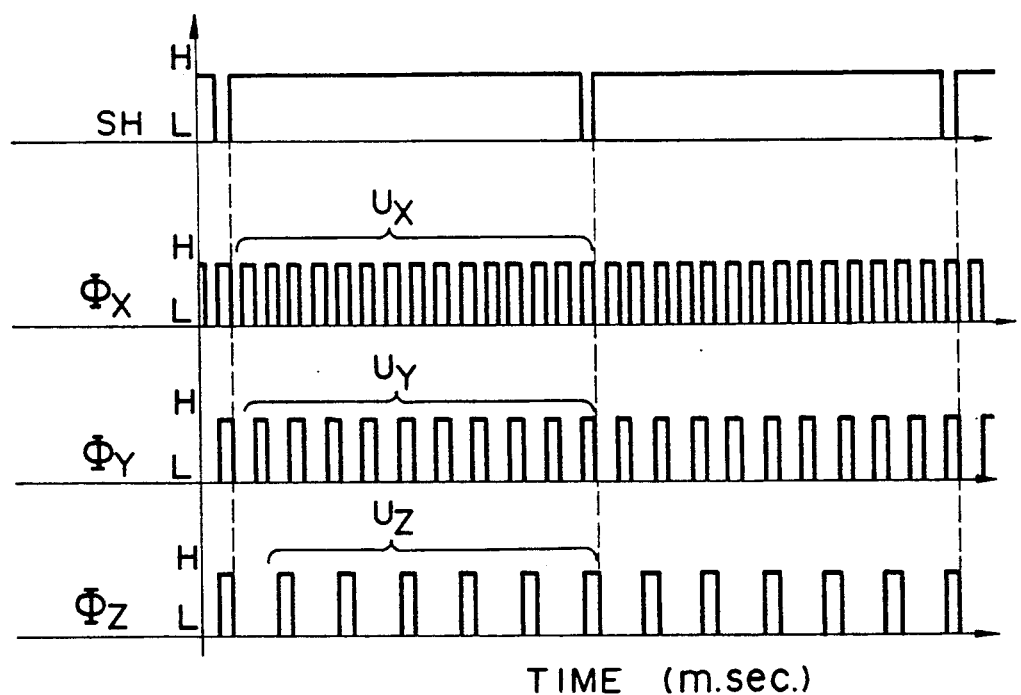
FIG. 4 is a timing chart, explaining the timing of operating the photoelectric converter built in the image-reading apparatus illustrated in FIGS. 1 and 2.

The timing charts shown in FIG. 4 shows the relationship between the light beam accumulation time SH, which is determined by the CCD driver 28 used for biasing the CCD line sensor shown in FIG. 3, and the reference pulses $\phi P$, which are output from the motor driver 29 used for rotating the motor 13 at a velocity corresponding to the light beam accumulation time SH.

In FIG. 4, reference symbol SH denotes the light beam accumulation time which is peculiar to the CCD line sensor. The value of this light beam accumulation time SH is maintained at the predetermined value on the basis of the manner in which the CCD driver 28 combines the clock pulse $\phi CL$, the multiplier unit Un, and the pulse ratio PR. In FIG. 4, reference symbols $\Phi X$, $\Phi Y$ and $\Phi Z$ denote the numbers of pulses which are supplied to the motor 13 at the time of linear reading densities DX, DY and DZ, respectively.

As is apparent from FIG. 4, $\Phi X$ pulses are reference pulses which are generated during the light beam accumulation time SH by the number of UX, $\Phi Y$ pulses are reference pulses which are generated during the light beam accumulation time SH by the number of UY, and $\Phi Z$ pulses are reference pulses which are generated during the light beam accumulation time SH by the number of UZ. Therefore, the shifting velocity Vn, at which the CCD line sensor is shifted during the light beam accumulation time SH over the region of reading width Wn, and the light beam accumulation time SH, which is the minimum time required for the CCD line sensor to reliably read the information supplied thereto, can be accurately synchronized with each other. In other words, the shifting distance Ln, for which either the carriage device or the CCD line sensor is shifted during the light beam accumulation time SH in correspondence to the linear reading density, and the light beam accumulation time SH, which is peculiar to the CCD line sensor, can be made to satisfactorily correspond to each other.

Now, the speed-changing mechanism or transmission, which is incorporated into the image reading apparatus, will be explained in detail below with reference to FIGS. 5 and 6.

Figure 5:
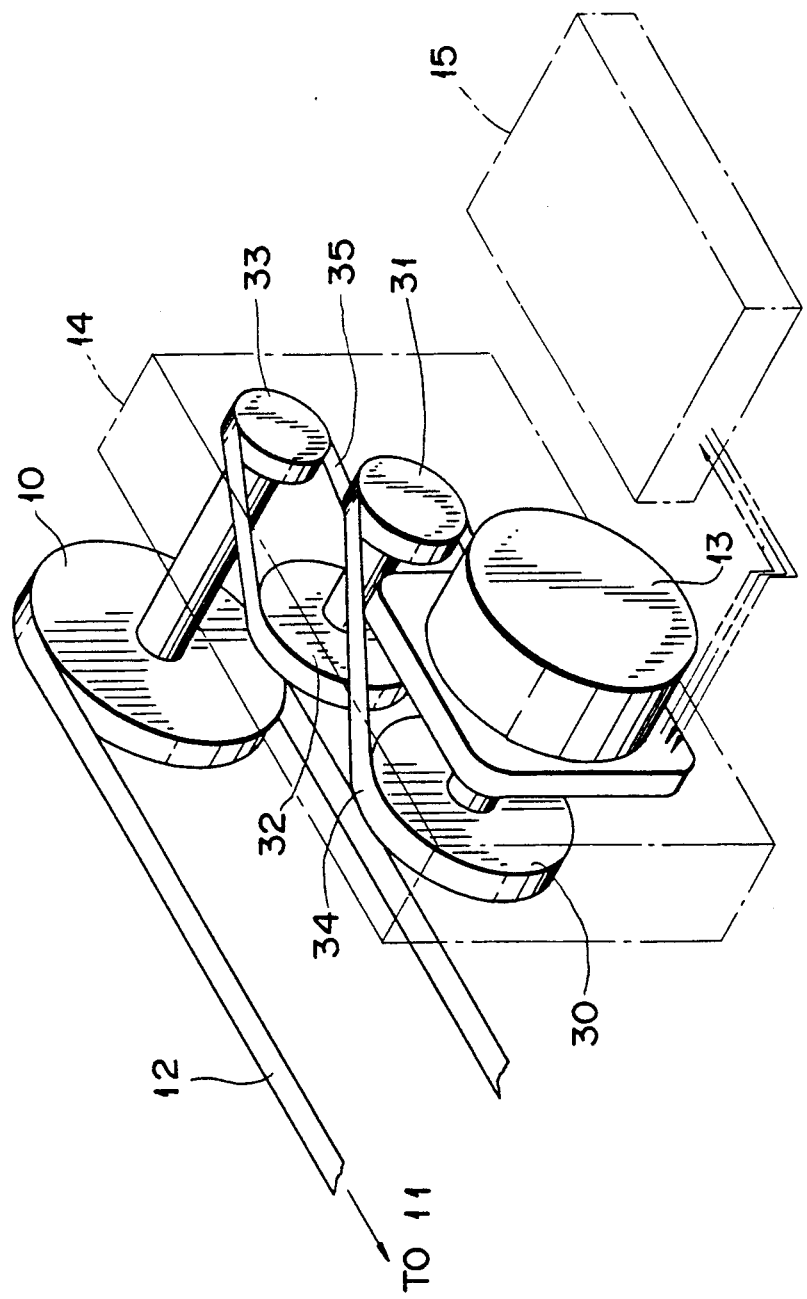
FIG. 5 is a schematic illustration of the construction of a transmission used for shifting the carriage device at desirable velocities.

As is shown in FIG. 5, speed-changing mechanism or transmission 14 contains a plurality of tooth belt pulleys 30, 31, 32 and 33, and tooth belts 34 and 35, steel belts each having teeth formed of rubber, resin, etc. These pulleys and belts are so combined as to change the output speed of the pulse step motor 13 from Na to Nc (Nc: a desirable output speed). This desirable output speed Nc is transmitted to the driving toothed pulley 10, for the driving of the tooth belt 12.

Let it be assumed: that the light beam accumulation time SH, during which the CCD line sensor 21 is driven is 16 ms; that the image-reading apparatus 1 is capable of reading images at linear densities of 6 lines/mm, 8 lines/mm, 12 lines/mm, and 16 lines/mm. These linear reading densities are shown below (D6, D8, D12, D16 are numerals representing the corresponding density).

$D6 = 6$ (lines/mm) (resolution: 1/6 lines/mm)

$D8 = 8$ (lines/mm) (resolution: ⅛ lines/mm)

$D12 = 12$ (lines/mm) (resolution: 1/12 lines/mm)

$D16 = 16$ (lines/mm) (resolution: 1/16 lines/mm) \hfill (14)

The reading widths W6, W8, W12, W16 are shown below:

$W6 = 1/6$ mm $= 166.7$ $\mu$m (in the case of D6)

$W8 = \frac{1}{8}$ mm $= 125.0$ $\mu$m (in the case of D8)

$W12 = 1/12$ mm $= 83.3$ $\mu$m (in the case of D12)

$W16 = 1/16$ mm $= 62.5$ $\mu$m (in the case of D16) ... \hfill (15)

It should be noted that there is a certain relationship among the above values of the reading linear densities, namely 6, 8, 12 and 16. To be more specific, the values 6, 8, 12 and 16 can be factorized as follows:

$6 = 2 \times 3$ $8 = 2^3$ $12 = 2^2 \times 3$ $16 = 2^4$

From these factors, the least common multiple (LCM) of 6, 8, 12 and 16 is obtained.

$LCM = 2^4 \times 3 = 48$

Let it be assumed that there are multiplier units U6, U8, U12, U16 corresponding to the LCM of 48 and the linear reading densities D6, D8, D12 and D16, respectively.

$U6 = 48/6 = 8$ $U8 = 48/8 = 6$ $U12 = 48/12 = 4$ $U16 = 48/16 = 3 ...$ \hfill (16)

From these formulas (16), the pulse numbers $\Phi 6$, $\Phi 8$, $\Phi 12$ and $\Phi 16$ can be given as follows by using the formulas (13):

$$\Phi 6 = U6 \times \phi P = 8 \times \phi P,$$

$$\Phi 8 = U8 \times \phi P = 6 \times \phi P,$$

$$\Phi 12 = U12 \times \phi P = 4 \times \phi P,$$

$$\Phi 16 = U16 \times \phi P = 3 \times \phi P \ldots \quad (17)$$

The reading widths W6, W8, W12 and W16 corresponding to the units U6, U8, U12 and U16 are as follows:

$$W6 = WP \cdot U6 = WP \times 8 = 166.7 \ \mu m$$

$$W8 = WP \cdot U8 = WP \times 6 = 125.0 \ \mu m$$

$$W12 = WP \cdot U12 = WP \times 4 = 83.3 \ \mu m$$

$$W16 = WP \cdot U16 = WP \times 3 = 62.5 \ \mu m \ldots \quad (18)$$

(WP is reading width, corresponding to the reference pulse $\phi P$).
Then, $$\begin{aligned} WP &= 166.7 \ \mu m/8 = 125.0 \ \mu m/6 \\ &= 83.3 \ \mu m/4 = 62.5 \ \mu m/3 \\ &= 20.83 \ \mu m \end{aligned} \quad (19)$$

It is assumed that lP represents the distance for which the carriage device 4 should be actually shifted in response to the application of the reference pulse $\phi P$ (the symbol "l" is used for discriminating the distance from the above-mentioned one, and the subscript "P" represents the reference pulse). The distances l6, l8, l12, l16 and lP for which the carriage device 4 should be actually shifted must be made equal to the widths W6, W8, W12, W16 and WP, respectively. That is to say:

$$l6 = W6, \ l8 = W8, \ l12 = W12, \ l16 = W16 \text{ and } lP = WP. \quad (20)$$

The distances l6, l8, l12 and l16 for which the carriage device 4 is actually shifted per the light beam accumulation time SH corresponding to the respective linear reading densities D6, D8, D12 and D16 are given as follows by using the formulas (18), (19) and (20):

$$l6 = 8 \times lP,$$

$$l8 = 6 \times lP,$$

$$l12 = 4 \times lP,$$

$$l16 = 3 \times lP \ldots \quad (21)$$

Let it be assumed: that the step angle $\theta$ of the pulse step motor 13 is 0.45° (that the motor 13 makes one rotation when supplied with the reference pulse $\phi P$ 800 times = 360°/0.45°); that the pitch circle diameter 2r of the driving toothed pulley 10, which permits the carriage device 4 to shift at a desirable velocity, is 15.52 mm.
Hence, $$\begin{aligned} l6 &= 166.7 \ \mu m = (8 \times 15.52 \times 0.45 \times \pi \times G)/360° \\ &= W6, \end{aligned} \quad (22)$$

$$\begin{aligned} l8 &= 125.0 \ \mu m = (6 \times 15.52 \times 0.45 \times \pi \times G)/360° \\ &= W8, \end{aligned}$$

$$\begin{aligned} l12 &= 83.3 \ \mu m = (4 \times 15.52 \times 0.45 \times \pi \times G)/360° \\ &= W12, \end{aligned}$$

$$\begin{aligned} l16 &= 62.5 \ \mu m = (3 \times 15.52 \times 0.45 \times \pi \times G)/360° \\ &= W16 \end{aligned}$$

From this formula (19), the conversion ratio G can be calculated as follows:

$$G \approx 1/2.9248 \ (in \ l6),$$

$$G \approx 1/2.9254 \ (in \ l8),$$

$$G \approx 1/2.9266 \ (in \ l12),$$

$$G \approx 1/2.9255 \ (in \ l16) \ldots \quad (23)$$

Therefore, from this formula (23), the conversion ratio G of the transmission 14 can be determined as follows by approximation:

$$G = 1/2.925 \ldots \quad (24)$$

Figure 6:
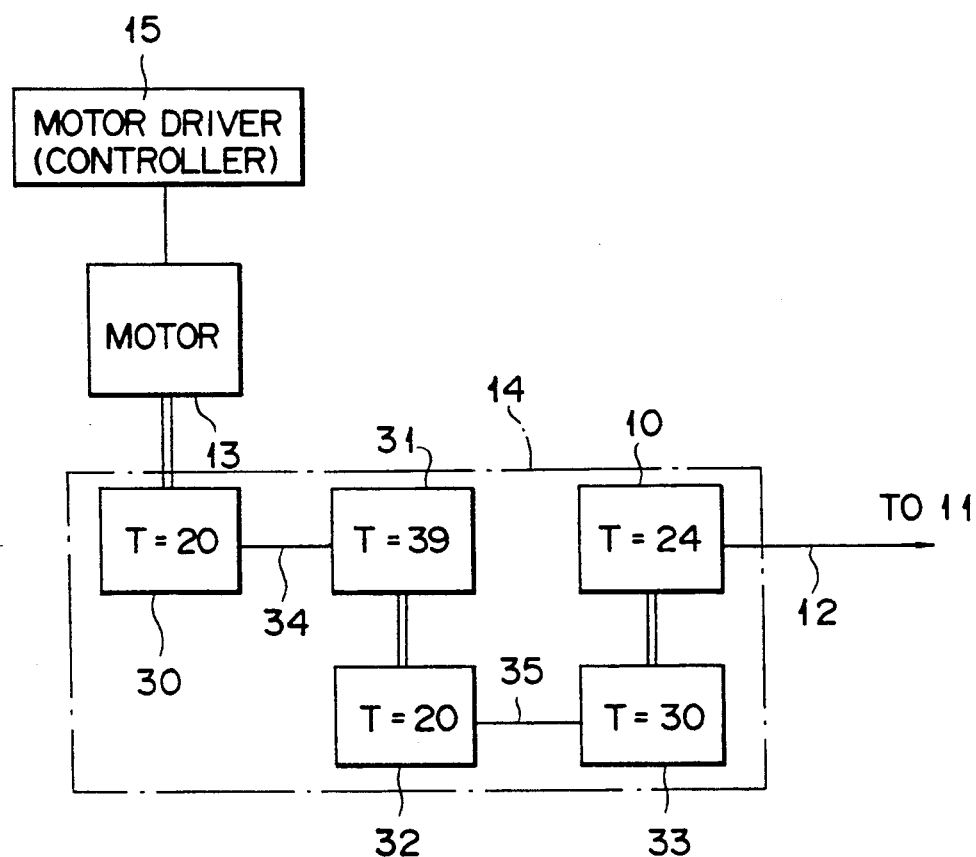
FIG. 6 explains a conversion ratio of the transmission shown in FIG. 5.

It should be noted that, in the case of the transmission shown in FIG. 6, the conversion ratio G is determined by:

[pulley 30 (number of teeth, i.e., T=20) : pulley 31 [T=39]] × [pulley 32 (T=20) × pulley 33 (T=30)] . (25)

With this conversion ratio G, the output speed Na of the motor 13 is converted to a desirable output speed Nc. To be more specific, the output speed Na of the motor 13 is converted from Na to Nb at the conversion ratio Ga of pulley 30 to pulley 31, which is:

$$Ga = 20:39 = 1:1.95 \ldots \quad (26)$$

Then, the output speed Na is converted from Nb to Nc at the conversion ratio Gb of pulley 32 to pulley 33, which is:

$$Gb = 20:30 = 1:1.5 \ldots \quad (27)$$

Thus, the total conversion ratio G is expressed by:

$$G = Ga \times Gb = (1:1.95) \times (1:1.5) = 1:2.925 \ldots \quad (28)$$

This formula (28) is equal to the calculated convert ratio G expressed by formula (24).

The "difference" between the distances L6, L8, L12 and L16, for which the carriage device 4 should be actually shifted by utilization of the conversion ratio of 2.925, and the reading widths W6, W8, W12 and W16, which the carriage device 4 should scan at one-time reading, will now be compared with each other. The distances L6, L8, L12 and L16, for which the carriage device 4 should be shifted during the light beam accumulation time in correspondence to the reading densities D6, D8, D12 and D16, can be easily obtained by use of formula (21). Therefore, LP can be calculated as below, on the basis of the assumption that the "$\Phi$" in formula (4) is 1.

$$LP = (\Phi \times \theta \times \kappa \times G)/360° \quad (29)$$
$$= \{(1 \times 0.45° \times 15.52 \times \pi) \times (1/2.925)\}/360°$$
$$\approx 20.84 \ \mu m$$

The distance for which the carriage device 4 should be actually shifted L6, L8, L12, and L16, i.e., the belt 12, is driven in correspondence of the light beam accumulation time of 16 ms are as follows:

$$L6 = 8 \times 20.84 \ \mu m = 166.72 \ \mu m \ (\text{in the case of } D6);$$

$$L8 = 6 \times 20.84 \ \mu m = 125.04 \ \mu m \ (\text{in the case of } D8);$$

$$L12 = 4 \times 20.84 \ \mu m = 83.36 \ \mu m \ (\text{in the case of } D12);$$

and $$L16 = 3 \times 20.84 \ \mu m = 62.52 \ \mu m \ (\text{in the case of } D16).$$

The distances L6, L8, L12 and L16, thus obtained, are substantially equal to the reading widths W6, W8, W12 and W16 expressed by formulas (15).

Accordingly, the distance for which either the carriage device 4 or the CCD line sensor 21 should be shifted during the light beam accumulation time SH, namely the reading width W determined in accordance with each linear density D, is substantially equal to the distance L for which either the carriage device 4 or the CCD line sensor 21 actually shifts during the light beam accumulation time SH.

On the other hand, the value of the reference pulse $\phi P$ or pulse rate is calculated as follows:

$$P \ rate = (1000 \ ms/16 \ ms) \times 360°/0.45° = 63 \ pps$$

(pulse per second)

The $\phi P$ rate of pulses $\Phi n$ which are supplied to the motor 13 in correspondence to each linear reading density Dn and which determine the rotation speed Nn of the motor 13 is expressed by $\Phi n = Un \times \phi P$. Therefore, the output speed Nn which corresponds to each linear reading density Dn is as follows:

$$N6 = 8 \times 63 \ pps \approx 500 \ pps \ (\text{in the case of } D6)$$

$$N8 = 6 \times 63 \ pps \approx 375 \ pps \ (\text{in the case of } D8)$$

$$N12 = 4 \times 63 \ pps \approx 250 \ pps \ (\text{in the case of } D12)$$

$$N16 = 3 \times 63 \ pps \approx 188 \ pps \ (\text{in the case of } D16)$$

Next, a description will be given of the operation of the image-reading apparatus shown in FIGS. 1–6.

First of all, a document O, which is of, e.g., the letter size (8.5×11 inches) and has a character or graphics image thereon, is placed on the document table or a transparent glass plate 3 in such a manner that the image-shown side of the document O is in contact with the transparent glass plate 3. The image-shown side of the document O is illuminated with a light beam emitted from the illuminating device 19 of the carriage device 4. The illumination device 19 is a tubular lamp extending in the lengthwise direction of the carriage device 4. The light beam reflected by the image-shown side of the document O is partly guided to the lens array 20 arranged perpendicular to the glass plate 3. The reflected light beam guided to the lens array 20, i.e., light beam representing the character or graphics shown on the document O, is focused on the CCD line sensor 21. This CCD line sensor 21 is arranged with reference to the glass plate 3 such that it is located at the focal point of the lens array 20. By the CCD line sensor, the light beam is converted into an electric image signal.

The information on the document O is read at a desirable one of the linear reading densities D6, D8, D12 and D16, with one of the reading widths W6, W8, W12 and W16 with respect to the main scanning direction being determined on the basis of the control information supplied in response to the operation of the linear reading density-selection keys 16a, 16b and 16c of the operation panel 18. At this time, the carriage device 4 is driven in the auxiliary scanning direction, due to the provision of the transmission 14. In this manner, the image portions within the elongate region determined by the width Wn of the document O are successively read and converted into electric image signals as the image data by the CCD line sensor 21. The electric image signals produced by the CCD line sensor 21 are converted or processed in a predetermined manner by a single-processing circuit (not shown), and are then supplied to a device (not shown), such as a memory device or a printer, which is externally connected to the image-reading apparatus.

In the embodiment mentioned above, the carriage device 4 is shifted in the auxiliary scanning direction by the combination of the motor 13, the transmission 14 and tooth belt 12, such that the carriage device 4 is shifted in the reading periods corresponding to the respective reading densities. Since the output speed of the motor 13 is expressed by $\Phi n$, i.e., "reference pulse $\phi P$" × "multiplier unit Un" and since these factors are obtained on the basis of the least common multiple (LCM) of 6, 8, 12 and 16, i.e., values representing the linear reading density Dn, the reading sensitivity of the CCD line sensor 21 can be maintained at a constant value.

Accordingly, the distance for which either the carriage device 4 or the CCD line sensor 21 should be shifted during the light beam accumulation time SH, namely the reading width W determined in accordance with each linear reading density D, is substantially equal to the distance L for which either the carriage device 4 or the CCD line sensor 21 actually shifts during the light beam accumulation time SH. Moreover, since the reading width corresponds exactly to the sensitivity of the CCD line sensor 21, the image information shown on a document can be accurately read, without being shifted in the auxiliary scanning direction.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for reading an image illuminated by a lamp element which emits light at a predetermined constant level, comprising:

means for selecting one of first and second modes, said first mode using a first number representing a first linear reading density for reading said image, and said second mode using a second number representing a second linear reading density for reading said image;

means for sensing line images which are reflected from said image, wherein said sensing means comprises a CCD line sensor which outputs image signals, corresponding to said line images, with a predetermined constant driving cycle; and means for moving said sensing means such that a light accumulation time of said CCD line sensor is constant for each of said modes, and such that the speed at which said CCD line sensor is moved in an auxiliary scanning direction is changed in accordance with the mode selected by said selecting means, said moving means including a pulse motor capable of changing a rotation thereof in accordance with the mode selected by said selecting means, and converting means for converting the rotation of said pulse motor to a linear movement of said sensing means in said auxiliary scanning direction, said converting means comprising a power transmission mechanism having a plurality of pulleys and belts and a conversion ratio determined on the basis of the least common multiple of said first and second numbers.

2. An apparatus according to claim 1, wherein said selecting means includes means for inputting one of the first and second modes, means for supplying one of first and second energizing pulses in accordance with the input mode to cause said pulse motor to rotate at one of first and second rotation rates.

3. An apparatus according to claim 2, wherein said selecting means includes means for inputting a third mode and for selecting one of the first, second and third modes, the third mode defining a third number representing a third linear reading density for reading the image.

4. An apparatus according to claim 3, wherein said moving means includes means for defining a conversion ratio based on the least common multiple of the first, second and third numbers.

5. An apparatus according to claim 2, wherein said selecting means includes means for inputting third and fourth modes and for selecting one of the first, second, third and fourth modes, said third mode using a third number representing a third linear reading density for reading said image, and said fourth mode using a fourth number representing a fourth linear reading density for reading said image.

6. An apparatus according to claim 5, wherein said moving means includes means for defining a conversion ratio based on the least common multiple of the first, second, third and fourth numbers.

7. An apparatus for reading an image of an object, comprising:

light source means for emitting a light beam at a predetermined constant level on said object;

sensing means, including a plurality of reading elements arranged in a first direction, for sensing a light beam reflected by said object with a predetermined constant driving cycle, and for converting the sensed light beam into an electric signal;

means for selecting one of first and second modes, said first mode using a first number representing a first linear reading density for reading said image, and said second mode using a second number representing a second linear reading density for reading said image; and means for moving said sensing means in a second direction perpendicular to said first direction, said moving means having a conversion ratio determined on the basis of a least common multiple of said first and second numbers, said moving means including a pulse motor and a plurality of pulleys and belts, said moving means being actuated by driving pulses from said pulse motor which correspond to both the number used by the selected mode and a multiple of said least common multiple.

8. An apparatus according to claim 7, wherein said selecting means includes means for supplying one of first and second energizing pulses in accordance with the selected mode to cause said pulse motor to rotate at one of first and second rotation rates.

9. An apparatus according to claim 7, wherein said selecting means includes means for selecting a third mode, said third mode using a third number representing a third linear reading density for reading said image, wherein said selecting means includes means for inputting one of said first, second, and third modes.

10. An apparatus according to claim 9, wherein said moving means includes means for defining a conversion ratio based on a least common multiple of said first, second, and third numbers.

11. An apparatus according to claim 7, wherein said selecting means includes means for selecting third and fourth modes, said third mode using a third number representing a third linear reading density for reading said image, said fourth mode using a fourth number representing a fourth linear reading density for reading said image, and wherein said selecting means includes means for inputting one of said first, second, third, and fourth modes.

12. An apparatus according to claim 11, wherein said moving means includes means for defining a conversion ratio based on a least common multiple of said first, second, third, and fourth numbers of linear reading densities.

13. An apparatus for reading an image of an object, comprising:

sensing means, including a plurality of reading elements arranged in a first direction, for sensing with a predetermined constant reading cycle a light beam emitted from a light source and reflected by said object, and for converting said sensed light beam into an electric signal, said electric signal representing a portion of image information obtained from a rectangular region of said object extending in said first direction;

means for selecting an appropriate linear reading density from among a plurality of predetermined linear reading densities, said selected linear reading density corresponding to a reading width which is determined in a second direction perpendicular to the first direction in accordance with said reading cycle, and representing the number of times said reading cycle is repeated with reference to a unit length; and means for moving said sensing means in said second direction in accordance with said selected linear reading density, said moving means including:

a transmission mechanism having a speed-change ratio determined on the basis of a least common multiple of said predetermined linear reading densities;

a pulse motor for driving said transmission mechanism; and a plurality of belts and pulleys, arranged between said transmission mechanism and said sensing means, for driving said sensing means a distance corresponding to a reciprocal number of said least common multiple.

14. An apparatus according to claim 13, wherein, in a case where the linear reading density selected by said selecting means is M, said moving means is driven in a cycle corresponding to a number which is M times larger than said reciprocal number.

15. An apparatus according to claim 13, wherein said selecting means includes means for inputting an input mode corresponding to one of said predetermined linear reading densities.

16. An apparatus according to claim 15, wherein said moving means includes means for defining a speed-change ratio based on the least common multiple of said predetermined linear reading densities.

* * * * *

UNITED STATES PATENT AND TRADEMARK OFFICE
CERTIFICATE OF CORRECTION

PATENT NO. : 5,150,227
DATED : September 22, 1992
INVENTOR(S) : Takashi Koshiyouji et al.

It is certified that error appears in the above-identified patent and that said Letters Patent is hereby corrected as shown below:

Abstract, line 19, change "$\phi p$" to --$\phi P$--.

Signed and Sealed this

Twenty-eighth Day of December, 1993

*Attest:*

BRUCE LEHMAN

*Attesting Officer*   *Commissioner of Patents and Trademarks*